United States Patent [19]

Zezuto et al.

[11] Patent Number: 4,700,192
[45] Date of Patent: Oct. 13, 1987

[54] TEST CONFIGURATION AND PROCEDURE FOR DETERMINING THE OPERATIONAL STATUS OF A PHASED ARRAY ANTENNA

[75] Inventors: Stephen V. Zezuto, Lancaster, Calif.; Paul H. Mountcastle, Glen Burnie, Md.

[73] Assignee: The United States of America as represented by the Secretary of the Air Force, Washington, D.C.

[21] Appl. No.: 818,924

[22] Filed: Jan. 15, 1986

[51] Int. Cl.$^4$ .............................................. G01S 7/40
[52] U.S. Cl. .................................................. 342/173
[58] Field of Search ............... 342/351, 360, 372, 173, 342/174; 343/703

[56] References Cited

U.S. PATENT DOCUMENTS

| | | | |
|---|---|---|---|
| 3,378,846 | 4/1968 | Lowenschuss | 343/100 |
| 4,128,812 | 12/1978 | Pavlis | 328/134 |
| 4,176,354 | 11/1979 | Hsiao et al. | 342/173 |
| 4,305,153 | 12/1981 | King | 342/360 |
| 4,424,483 | 1/1984 | Aslan | 324/95 |
| 4,434,397 | 2/1984 | Nelson | 324/58 R |
| 4,453,164 | 6/1984 | Patton | 343/360 |
| 4,532,518 | 7/1985 | Gaglione et al. | 343/703 |

Primary Examiner—Theodore M. Blum
Attorney, Agent, or Firm—William G. Auton; Donald J. Singer

[57] ABSTRACT

The operational status of individual phase control modules within a phased array antenna can be determined using a radio frequency oscillator, a directional coupler, a spiral antenna, an attenuator, a harmonic frequency converter, a network analyzer, and a phase magnitude display. The radio frequency oscillator generates a test radio frequency signal which is conducted into the sum port of the array by the directional coupler. The phase control modules normally phase shift radio frequency signals they receive from the sum port by amounts indicated in a command signal from the radar control system. When using this test system, the radar control system should be directed to send a test command signal which direct the phase control modules to repeatedly phase shift received radio frequency signals between a first and second phase state. The spiral antenna, when placed in proximity of each individual phase control module, receives and conducts phase shifted radio frequency signals to the harmonic analyzer. The harmonic analyzer samples and conducts the phase shifted radio frequency signals and original radio frequency signals into the network analyzer for comparison. When the first phase state is 180°, the display, which receives the output of the network analyzer clearly indicates if the phase control module is phase shifting the radio frequency signal in response to the test command signal.

2 Claims, 1 Drawing Figure

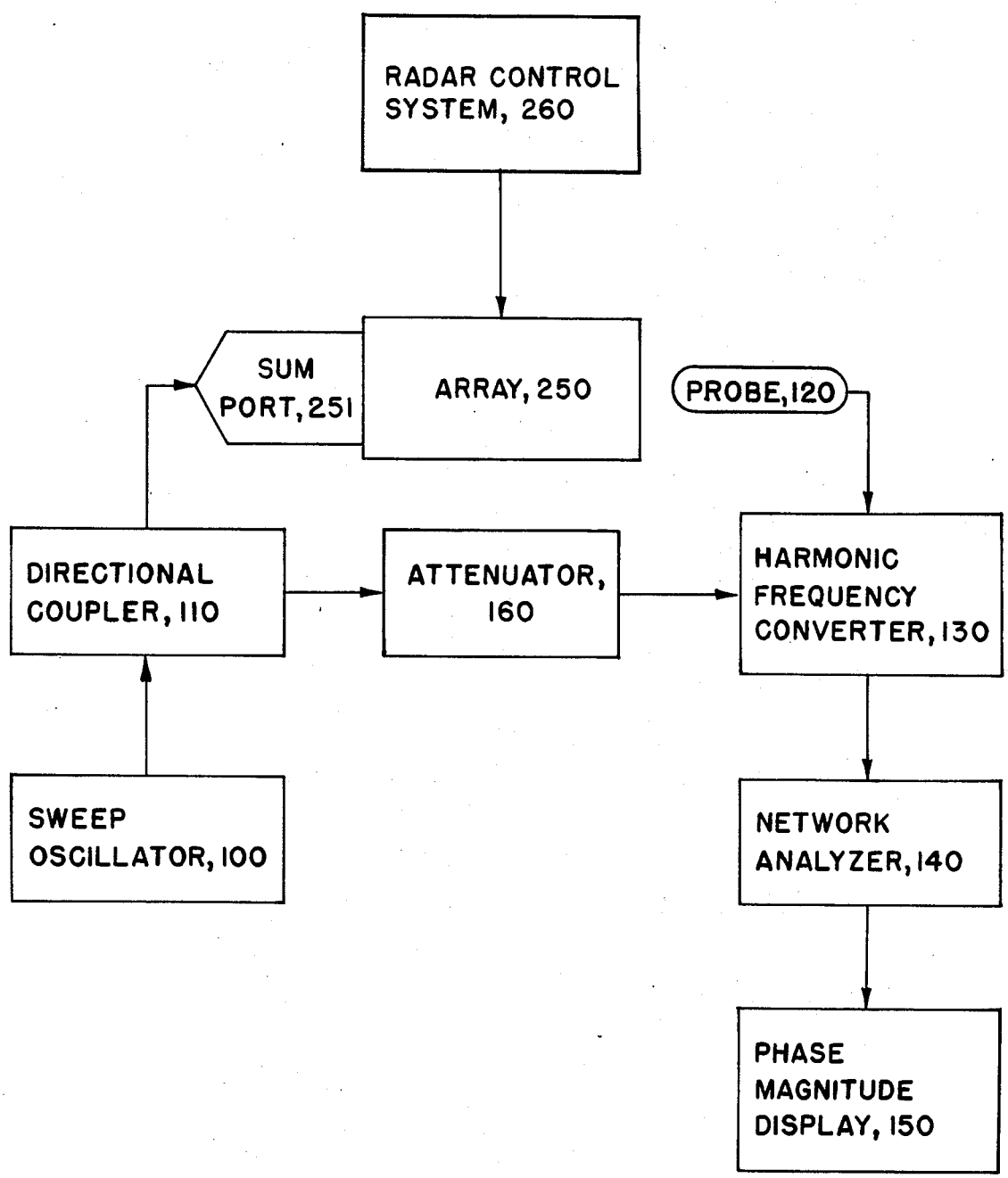

TEST CONFIGURATION AND PROCEDURE FOR DETERMINING THE OPERATIONAL STATUS OF A PHASED ARRAY ANTENNA

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to phased array antenna systems and specifically to a portable test system and technique to determine the operational status of phase control modules (PCM) within a phased array antenna.

Phased array antennas that can be steered electronically are finding increasing applications in both radar and communication systems. In radar, the electronically steerable phased array antenna appears to be the best way to track or search many targets widely separated in space. An electronically steered phased array antenna can slew rapidly on a pulse-to-pulse basis throughout the entire azimuth and elevation region accessible to the radar, leading to multiple-target tracking capability. For communications, phased array antennas provide the maximum practical gain over other steerable antennas which suffer from limitations imposed by stress capabilities and manufacturing tolerances in materials. The gain which can be achieved by electronically steerable phased array radar antennas is limited only by the amount of land available and by dispersion along the propagation path. Phased array radar systems offer many advantages over mechanically swept antennas, the most notable being their ability to select a given azimuth and elevation pointing angle without physically moving the antenna.

A problem with phased array antennas is the testing of the phase control modules may be construed as element drivers power and phase control and amplification in the array. Remote radar systems are not easily transported back to a test facility. The task of remotely testing phased array antennas is alleviated, to some degree, by the following U.S. Patents, which are incorporated herein by reference.

U.S. Pat. No. 3,378,846 issued to Lowenschuss on 16 Apr. 1968;

U.S. Pat. No. 4,128,812 issued to Pavlis on 5 Dec. 1978;

U.S. Pat. No. 4,424,483 issued to Aslan on 3 Jan. 1984;

U.S. Pat. No. 4,434,397 issued to Nelson on 28 February 1984; and

U.S. Pat. No. 4,453,164 issued to Patton on 5 June 1984.

Lowenschuss is directed to a method and apparatus for testing the individual elements and phase shifters of a phased array antenna. A reference signal is supplied to the array from a continuous wave (CW) source and test antenna. The array is steered by phase shifters receiving array control command signals from an array control command circuit. Phase shifters are varied one at a time in a prescribed manner by the array control commands. A large radiator picks up signals from the antenna radiators and supplies them to a receiver for processing.

Aslan shows a portable instrument for monitoring the power density of a microwave field. The device of this patent includes a probe which carries a spiral antenna. Patton uses near field data to correct the phase of individual elements of a phased array antenna. Nelson discloses an adaptive technique for monitoring the individual currents in a phased array antenna system. Pavlis discusses a phase discriminator for indicating when a signal is either in phase with a reference signal or alternately 180 degrees out of phase with a reference signal.

The task of transporting elaborate and cumbersome test equipment to an antenna can prove as trying as transporting the antenna itself to a test facility. From the foregoing discussion, it is apparent that there currently exists a need for a portable phase shifter (or radiating element) testing system. The present invention is intended to satisfy that need.

SUMMARY OF THE INVENTION

This invention is directed to a portable unit for testing the individual phase control modules (or radiating entitys) (PCMs) within a phased array antenna. A sweep oscillator is used as an RF source and fed into the sum port of the array. This energy is phase shifted by each PCM and then radiated out where it is received by a spiral antenna used as a probe. The spiral antenna is used here for convenience. The actual probe type depends upon the characteristics of the elements being tested.

A harmonic frequency converter and network analyzer are used to compare the received RF to the reference signal and determine the relative phase difference. During the test the PCMs (elements) in the array are repeatedly commanded to introduce two different amounts of phase shift, i.e., they are "toggled" from zero degrees phase shift to 180 degrees, then back to zero, and so on.

A failed PCM (element) yields a stationary dot on the phase/magnitude display indicating that the PCM is stuck in one particular phase state and not responding to phase shift commands. Note that the selection of zero degrees and 180° as a first and second phase state is intended to be just two examples of two different amounts of phase shift. Other amounts of phase shift, which are too numerous to mention, could also be used to provide a first and second phase state.

It is an object of the present invention to test individual phase control modules within a phased array antenna.

It is another object of the present invention to provide a portable means of testing phase control modules.

It is another object of the present invention to test phase control modules by repeatedly commanding them to introduce a first then a second amount of phase shift while monitoring their output signals and determining if they respond to phase shift commands.

These objects together with other objects, features and advantages of the invention will become more readily apparent from the following detailed description when taken in conjunction with the accompanying drawing wherein like elements are given like reference numerals throughout.

DESCRIPTION OF THE DRAWINGS

The sole figure of the drawing is a sketch illustrating an embodiment of the present invention.

DETAILED DESCRIPTION OF THE PREFERRED EMBODIMENT

The present invention is a portable test system for determining the functional condition of phase control modules within a phased array antenna.

The reader's attention is now directed to the figure which is a sketch illustrating an embodiment of the present invention. The portable test system of the figure includes a sweep oscillator 100, a directional coupler 110, a probe 120, a frequency converter 130, a network analyzer 140, a phase display 150, and an attenuator 160.

The sweep oscillator 100 is used as a radio frequency (RF) source which is conducted by the directional coupler 110 into the sum port 251 of the array 250. This energy is phase shifted by each PCM and then radiated out where it is received by a spiral antenna 120 used as a probe, (other types of array elements could require a different element coupling or probe).

In this particular example, the array was designed to operate in the x-band frequency range, so an x-band sweep oscillator was used in the form of a HP 8690B oscillator produced by Hewlett-Packard. The directional coupler 110 is a 30 dB directional coupler which produces two output signals by conducting the RF signals produced by the sweep oscillator. The first output signal is input into the array, as described above. The second output signal is conducted by the attenuator 160 into the harmonic frequency converter to serve as a reference.

The harmonic frequency converter 130 and network analyzer 140 are used to compare the received RF to the reference signal and determine the relative phase difference. During the test the PCMs in the array are repeatedly commanded to introduce two different amounts of phase shift, i.e., they are "toggled" from zero degrees phase shift to 180 degrees, then back to zero, and so on.

Finally, an HP 8412 B phase magnitude display 150 receives the output signal of the network analyzer which indicates the comparison between the reference signal and the received RF. A failed PCM yields a stationary dot on the phase/magnitude display indicating that the PCM is stuck in one particular phase state and not responding to phase shift commands.

For the above test, it is required that the phase control modules be repeatedly commanded to induce two different amounts of phase shift. In the example described above, the PCM's were repeatedly toggled into a first phase state consisting of a zero degrees phase shift; then into a second phase state of 180° phase shift. Note that the selection of zero degrees and 180° as a first and second phase state is intended to be just two examples of two different amounts of phase shift. Other amounts of phase shift, which are too numerous to mention, could also be used to provide a first and second phase state.

The procedure for using the equipment in the figure includes the following steps:

1. Set the gain on the oscillator to zero.
2. Set the oscillator to "STAND-BY" and the network analyzer "ON".
3. Switch the oscillator to continuous wave (CW) output; set its frequency to somewhere within the operating range of the array; and switch the oscillator on.
4. Adjust the gain of the oscillator by increasing it until the network analyzer is in its operate region.
5. Perform a check of the test system by first placing the probe against the array face and then slowly backing the probe away. While doing this, the dot on the analyzer phase display should move vertically. This indicates an RF phase shift and says that the equipment is working.
6. Begin repeatedly commanding the PCM's in the array to sequentially induce two different amounts of phase shift into the RF signals. (For example from a first phase state of zero degrees phase shift; then to a second phase state of 180 degrees; then back to zero degrees).
7. Test individual PCM's by probing the array face. This is done by placing the spiral antenna or probe on the faceplate and then centering the probe over an individual PCM. (Positioning and appropriate probe mode matching to the array element is important since you want to look at the response of only one element, or group of elements, at a time).

When the probe is over a PCM which is up-dating, the phase magnitude display will show a dot which alternates or moves vertically between two phase positions on the display. Usually the distance between the two phase positions is 180° (2 divisions on the trace with the scale CRT at 90 degrees/division). If the PCM is not updating the display will show a stationary dot which indicates that the PCM is stuck in one state and not responding to phase shift commands.

It is possible that the display will show a phase shift of less than 180°. This is usually caused by not having the probe directly centered over a bad element. When this happens the probe picks up the signal from adjacent element.

The less than 180° phase shift can also indicate a failed element. As a rule of thumb, any element which phase shifts less than 45° can be considered failed. At present this is a qualification test which indicates whether a PCM is operating or not. It does not necessarily indicate whether a PCM is phase shifting the correct amount.

The duration of the hold updates should be approximately 500 m seconds so that the array is commanded to two different phase states per second. This allows the operator to easily follow the phase shift display during the test.

The major advantage of this test over others presently used is that the equipment is portable making it possible to trouble-shoot phased arrays wherever they are being used whether that be on a plane or in other test configurations. This is important since most phased arrays including the array are of substantial weight making it costly to move them to repair depots.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a phased array antenna which has a sum port and a plurality of phase control modules, each of said phase control modules receiving a test command signal from a radar control system and radio frequency signals from said sum port, each of said phase control modules outputting a phase shifted radio frequency signal by phase shifting said radio frequency signals repeatedly from a first phase state to a second phase state and back as directed by said test command signal, a portable test system which determines whether each of said plurality of phase control modules is phase shifting received radio frequency signals, said portable test system comprising;

an oscillator which outputs a radio frequency signal;

a directional coupler which is electrically connected to said oscillator and said sum port of said array, said directional coupler receiving said radio frequency signal from said oscilator and conducting it into said sum port of said array thereby causing said array to radiate a test signal;

a probe which receives and conducts said test signal from said array;

an attentuator which provides a reference signal by receiving and attenuating said radio frequency signal from said directional coupler;

a harmonic frequency converter which produces a first output signal by receiving and converting into a harmonic frequency said reference signal from said attenuator, said harmonic frequency converter producing a second output signal by receiving and converting into a harmonic frequency said test signal from said probe;

a network analyzer which produces an output signal by receiving and comparing said first and second output signals from said harmonic frequency converter; and a phase magnitude display which receives and displays said output signal from said network analyzer, said phase magnitude display thereby indicating whether said test signal is being repeatedly shifted by said phase control modules in response to said test command signal from said radar control system.

2. A portable test system, as defined in claim 1, wherein said probe comprises a spiral antenna which is electrically connected to said harmonic frequency converter, said spiral antenna having a limited size which allows it to be placed over a single phase control module in an array and receive said test signal just in response to said single phase control module, said spiral antenna therefor enabling said portable test system to individually test all of said plurality of phase control modules in said array.

* * * * *